Oct. 8, 1968

F. BONNERIC 3,404,742

APPARATUS FOR PREPARING EQUAL PONDERAL DOSES
OF TOBACCO OR LIKE MATERIAL

Original Filed Dec. 24, 1964

INVENTOR
Francis Bonneric

By
Sparrow and Sparrow
ATTORNEYS

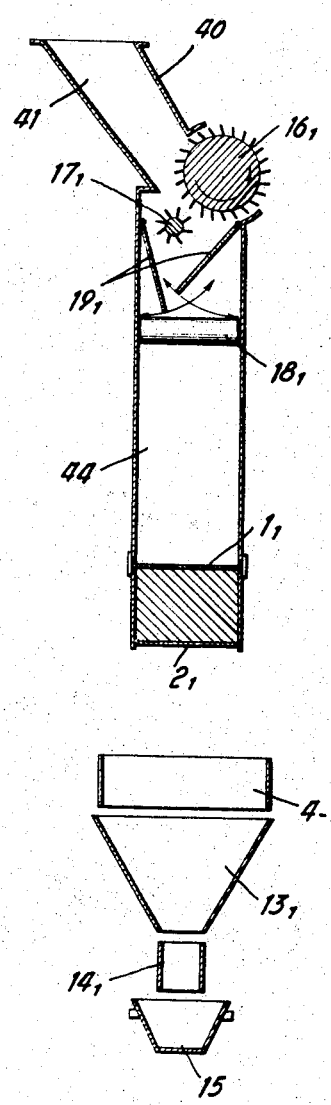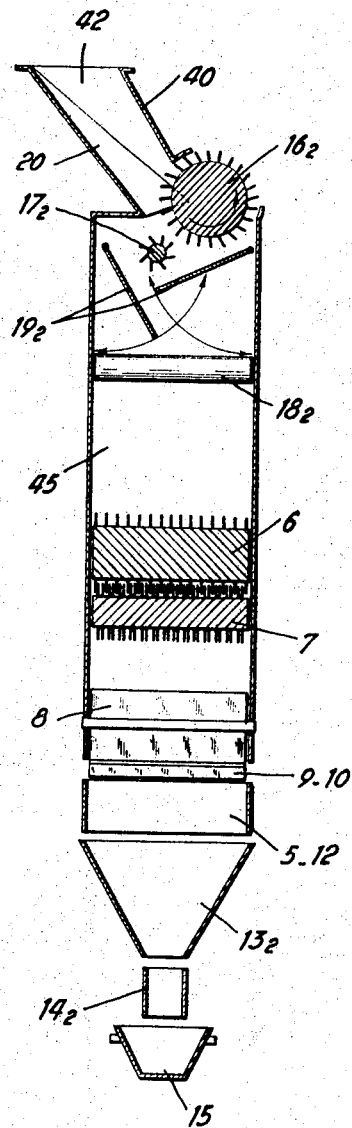

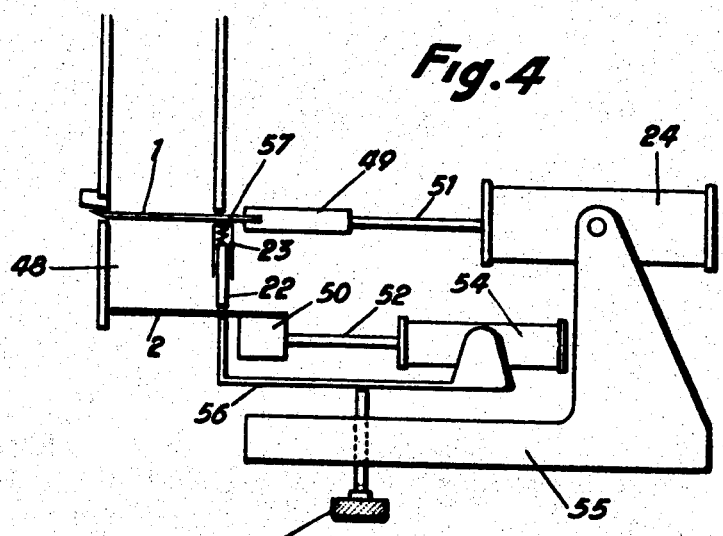
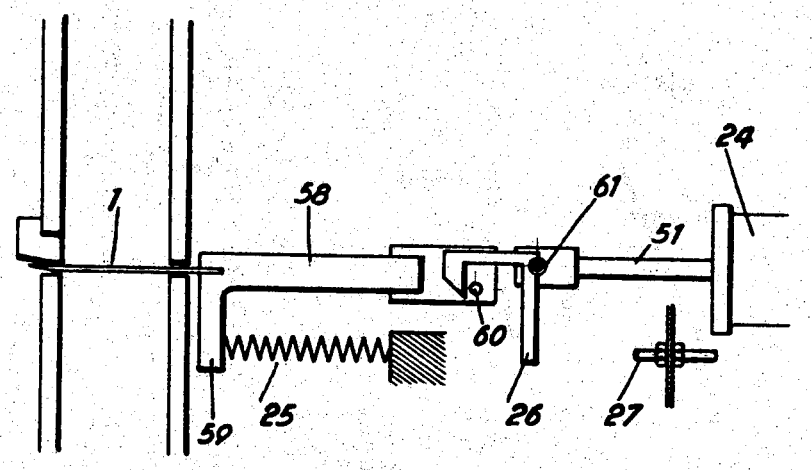
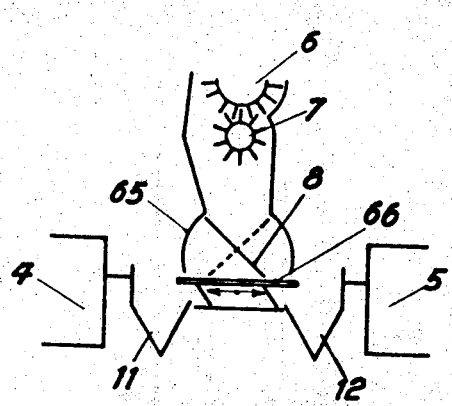

United States Patent Office 3,404,742
Patented Oct. 8, 1968

3,404,742
APPARATUS FOR PREPARING EQUAL PONDERAL DOSES OF TOBACCO OR LIKE MATERIAL
Francis Bonneric, Fleury-les-Aubrais, France, assignor to Service d'Exploitation Industrielle des Tabacs et des Allumettes, Paris, Seine, France, a French public establishment
Continuation of abandoned application Ser. No. 420,938, Dec. 24, 1964. This application June 6, 1967, Ser. No. 649,066
Claims priority, application France, Dec. 23, 1963, 958,497
15 Claims. (Cl. 177—59)

ABSTRACT OF THE DISCLOSURE

An apparatus for preparing equal and successive doses of fluent material by means of volumetric pre-doses completed by make-up doses having a unit for alternately preparing a pre-dose of a predetermined volume, a unit for receiving the pre-dose, a unit for alternately supplying make-up material of a predetermined volume to the receiving unit, a unit for weighing the receiving unit, a releasing unit for the receiving unit controlled by the weighing unit for distributing a prepared dose (pre-dose plus make-up dose) into a transfer container.

---

This application is a continuation of application Ser. No. 420,938 filed Dec. 24, 1964, now abandoned.

The present invention relates to an apparatus for preparing equal and successive ponderal doeses of material and particularly of tobacco by means of volumetric pre-doses completed by make-up doses.

In tobacco-packing machines, the supply of material is usually performed by hand in semi-volumetric doses (handfuls), the weight of which is adjusted by make-up doses, and it is known to distribute these doses mechanically by means of a double feed system.

The present invention has for its object to improve the automatic distribution of the doses by regulating the pre-dose and the make-up dose relatively to each other.

To this end, the invention has for its object an apparatus which comprises at least one means for preparing pre-doses of determined volume, means for supplying make-up material, at least two intermediate receiving units for receiving said prepared pre-doses and said supplied make-up material and for constituting the requisite ponderal doses, means for weighing each of said intermediate receiving units and adapted to deliver and end-of-weighing signal when the weight of material contained in said receiving units reaches a predetermined value, means for releasing each pre-dose once said pre-dose has been prepared, means for distributing said pre-doses to said intermediate receiving units, means for distributing the make-up material to said intermediate receiving units, means for distributing prepared doses from the intermediate receiving units into transfer containers brought successively to the apparatus and means for controlling said preparing, releasing and distributing means in dependence on determined cyclic signals on said end-of-weighing signals.

In one form of embodiment, separate means for preparing two pre-doses are provided and disposed respectively above each of the two intermediate receiving units, the distribution of the pre-doses being in that case affected under the action of gravity, and the means for supplying make-up material is disposed between said separate means for preparing the two pre-doses and at an equal distance from each of said preparing means, the means for distributing make-up material being placed beneath said means for supplying said make-up material.

The means for distributing to the transfer containers the doses made up in the intermediate receiving units can comprise beneath each of said intermediate receiving units a vertical passageway which has its opening above a controlled-opening gate.

The means for preparing pre-doses can each comprise a vertical supply passageway and two blades which are mounted in such a manner as to be capable of sliding transversely with respect to said passageway and of closing off or freeing the internal cross-sectional area of said passageway and which can be actuated by compressed-air jacks.

The volume of the pre-dose depends on the cross-sectional area of the passageway and on the spacing of the blades. Said volume can be made variable by providing a variable spacing of the blades either by hand or by motor means.

When the bottom blade is in the position of closure of the passageway, the movement of the top blade controls the completion of the pre-dose and, after completion of the pre-dose, the bottom blade initiates the release of the pre-dose which falls into the corresponding weighing receiving unit.

The means for supplying make-up material can comprise a vertical passageway inside which is mounted a studded cylinder which has a variable speed of rotation and which is in principle associated with a crumbling cylinder. Said studded cylinder can also be operated at constant speed over a variable period of time.

Provision can be made upstream of the means for preparing pre-doses and of the means for supplying make-up material for a general feed system consisting of a single hopper designed to discharge into a tank which is subdivided by means of partition walls or splitters into as many compartments as there are passageways to be supplied, each of said compartments being preferably fitted with a set of separating cylinders designed to distribute the material onto a set of feed-rollers, if necessary through the intermediary of deflector plates. Each set of separating cylinders could be mounted on a same shaft but independently of each other and operated at either constant or variable speed in dependence on the level of material which is present in the corresponding compartment.

The weighing means can consist of balances of the semi-Robervallian type comprising a pan which extends across the entire width of the distributor and preferably fitted with a locking device of the cylindrical cam type.

The completion of the weighing operation can be detected by means of an electric contact which closes the circuit as the balance swings. Different systems such as a strain gauage, pallet system, electroplunger system, make it possible to replace the above-mentioned binary indication by a continuous indication.

The means for distributing the make-up material can consist of a pivotal pallet which is controlled by the end-of-weighing signal. The said pallet can be associated with shutters which define with accuracy the end of supply of make-up material or, preferably, with a horizontal vibratory plate which defines said end of supply even more effectively without the disadvantage of permitting an accumulation of material to remain within the distributor after each pivotal motion of the pallet.

An example of construction of an apparatus in accordance with the invention which is more especially designed for the regulated supply of tobacco with certain alternative forms of execution, has been illustrated in the accompanying drawings, in which:

FIG. 2 is a view in cross-section taken along the line II—II of FIG. 1;

FIG. 3 is a view in cross-section taken along the line III—III of FIG. 1;

FIG. 4 is a detail view on a larger scale of the device for preparing pre-doses in the apparatus of FIG. 1;

FIG. 5 is a detail view of an alternative form of assembly of the top blade of the device of FIG. 4;

FIG. 6 is a detail view of an alternative form of embodiment of the device for distributing make-up material in the apparatus of FIG. 1;

Figure 1:
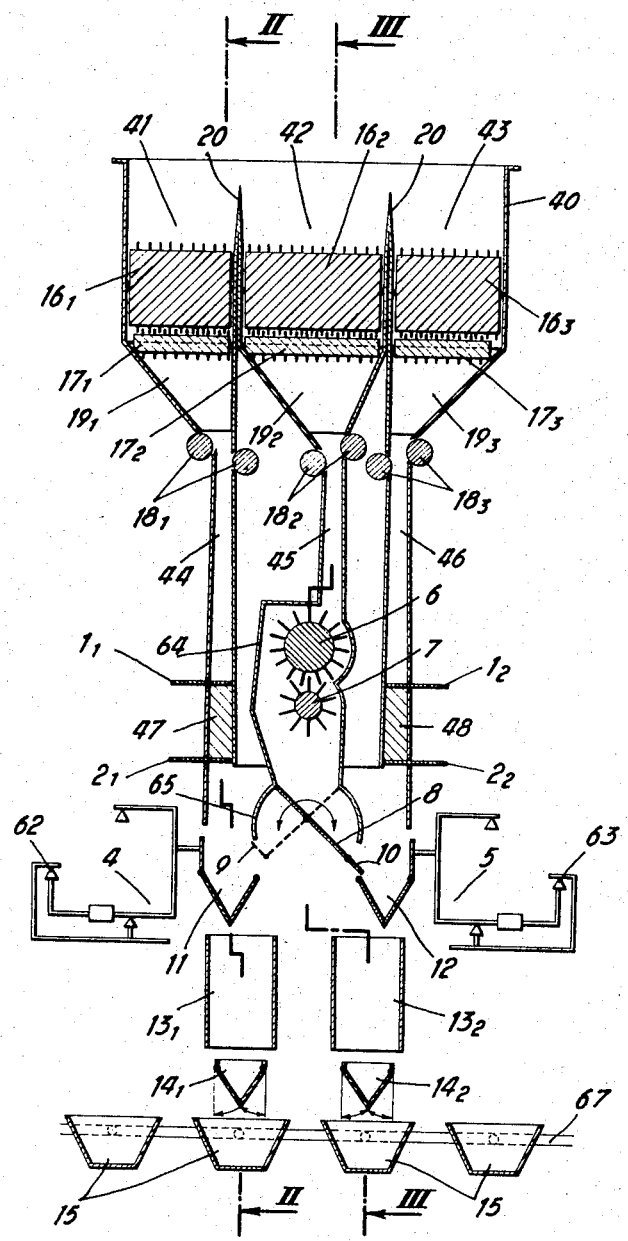
FIG. 1 is a diagrammatic view in vertical cross-section of the complete apparatus.

In the example which is illustrated in FIGS. 1 to 3, the dosing apparatus or feed regulator in accordance with the invention comprises at the top portion thereof a tank 40 which is supplied from a hopper (not shown) and which is subdivided into three compartments 41, 42, 43 by means of partition walls 20 forming splitters which are designed to initiate the separation of the tobacco into a number of streams for the purpose of effecting the supply of tobacco without clogging. Studded separating or carding cylinders $16_1$, $16_2$, $16_3$ are mounted respectively within the above-mentioned compartments together with crumbling cylinders $17_1$, $17_2$, $17_3$ which are mounted on two continuously rotating shafts. Said cylinders are independent and are either started up or stopped under the action of electromagnetic clutch systems controlled by a level detector in the case of each passageway. After passing out of said compartments 41, 42, 43, the tobacco is directed by pairs of pivotally-mounted deflector plates $19_1$, $19_2$, $19_3$ to which is imparted a back-and-forth motion towards pairs of feed-rollers $18_1$, $18_2$, $18_3$ which are mounted at the top of vertical passageways 44, 45, 46, respectively.

The central passageway 45 is intended for the purpose of supplying make-up tobacco and the two lateral passageways 44, 46 of smaller cross-sectional area are designed for the purpose of forming and distributing pre-doses.

There are mounted in each of the passageways 44 and 46 blades $1_1$, $2_1$ and $1_2$, $2_2$ respectively which delimit the chambers 47, 48 for forming pre-doses. The above-mentioned blades 1, 2 (as shown in FIG. 4) are carried by supports 49, 50 which are integral with the piston rods 51, 52 of two jacks 24 and 54. The top blade 1 which is provided with a cutting edge along the end thereof is adapted to move only in a horizontal plane whereas the blade 2 can be displaced vertically by means of a screw 21 which is mounted in the support 55 of the jack 53 and which is designed to produce action on the support 56 of the jack 54. There is also associated with said support 56 a wall 22 which is adapted to slide within a socket 23 and urged by a spring 57 in such a manner that leak-tightness of the chamber 48 is maintained.

In the alternative form of FIG. 5, the jack 24 is of the double-acting type and the blade 1 is connected to the rod 51 by means of a member 58 provided with an arm 59 and a stud 60, said stud being adapted to cooperate with a lever 26 which is pivotally mounted at 61 on the piston rod 51. A spring 25 constantly urges the arm 59 and consequently the blade 1 into the position of closure and, when the jack rod has withdrawn to its full extent, a stop 27 causes the lever 26 to pivot and therefore releases the stud 60, thereby releasing the member 58 and consequently the blade 1 which, under the expanding action of the spring 25, cuts the tobacco within the passageway 46 (or 44).

Figure 7:
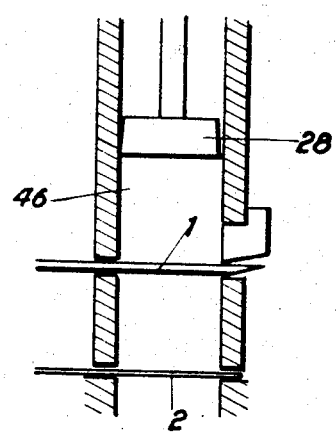
FIG. 7 is a detail view of an alternative form of the device for preparing pre-doses.

In the alternative form of FIG. 7, provision is made within the passageway 46 (or 44) for a ram or piston 28 which exerts a pressure on the tobacco.

Elongated pans 11 and 12 respectively which extend over the entire width of the passageway are placed underneath each chamber 47, 48 for the formation of pre-doses. Said pans are attached to balances 4, 5 respectively of the semi-Robervallian type, for example, which are fitted with a cam-type locking system and contacts 62, 63 which are intended at the time of closure to deliver the end-of-weighing signal.

The central passageway 45 has an extension in the form of a chamber 64 within which is mounted a studded cylinder 6 with associated crumbling cylinder 7 and driven from a direct-current motor of the variable speed type or from a motor of the constant speed type.

There is installed beneath the chamber 64 a distributor 65 fitted with a controlled pivoting flap or pallet 8 by means of which the stream of make-up tobacco is diverted alternately towards the two pans 11 and 12. The said pallet 8 is associated with secondary shutters 9 and 10.

In the alternative form which is illustrated in FIG. 6, the pallet 8 is shorter in length and is associated with a vibratory plate 66 which immediately checks the supply of make-up tobacco into the pans 11, 12 when it stops vibrating.

Underneath the pans 11, 12 are located discharge passageways at the bottom end of which are mounted gates $14_1$, $14_2$ which serve to release the doses into the buckets 15 of the conveyor-chain 67.

The operation of the apparatus which is illustrated in FIGS. 1 to 4 is as follows:

The cycle of operation is considered from the moment at which a single or pulse is delivered by the balance 4 when the weighing of the pan 17 has reached completion. It is first of all assumed that the cylinder 6 is operated at a speed which is regulated as a function of the time-interval between the end-of-weighing pulse and the cycle pulse which is synchronized with the operation of conveyor buckets 15 which are intended to feed a tobacco packing machine.

The blades $1_1$, $2_2$, $1_2$, $2_2$ are closed and the chambers 47, 48 each contain a pre-dose. The balance 5 being released, the blade $2_2$ opens and the pan 12 receives the predose which has been prepared within the chamber 48.

The shutter 9 closes whereas the shutter 10 opens and the pallet 8 performs a pivotal motion so as to divert the make-up stream towards the pan 12.

While the necessary make-up quantity is discharged into the pan 12, the balance 4 locks, the pan 11 opens and discharges its dose into the passageway $13_1$ which is shut off by the gate $14_1$, then closes again. The gate $14_1$ discharges the dose into the conveyor bucket 15 at the moment of passing of this latter, then closes again.

When the pan 11 is closed, the blade $2_1$ opens and the pre-dose which is contained within the chamber 47 falls into said pan 11. The balance is accordingly released.

When the blade $2_1$ has closed again, the blade $1_1$ opens and the following pre-dose is prepared within the chamber 47. The blade $1_1$ closes again and the following pre-dose referred to is thus in readiness.

When the pulse is delivered at the moment of completion of weighing of the pan 12, the pan 11 is ready to receive the make-up quantity after having already received the pre-dose which was prepared in the chamber 47.

The shutter 10 closes whilst the shutter 9 opens and the pallet 8 pivots so as to divert the stream of make-up tobacco towards the pan 11. The operations proceed as indicated above but the functions performed by the pans 11 and 12 are reveresed.

It has been assumed in the foregoing that the speed of the cylinder 6, that is to say the speed of distribution of make-up material was variable and regulated in dependence on the time-interval between the end-of-weighing pulse and the cyclic pulse and this latter is then produced only in order to carry out this speed-regulation whilst the end-of-weighing pulse alone serves to trigger all of the movements described above.

On the other hand, if the speed of the cylinder 6 or in other words the rate of distribution of make-up material remains constant, it is in that case the cyclic pulse which controls the preparaton of the pre-doses and the distribution of make-up material whereas the end-of-weighing pulse only serves to stop the supply of make-up material and initiate the discharge of doses.

Figure 9:
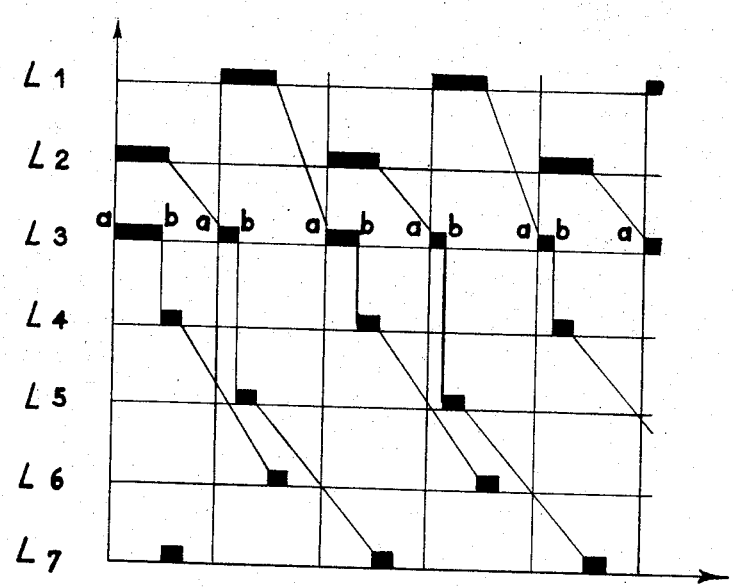
FIG. 9 is an explanatory diagram of the cyclic progress of the various operations which are performed by the apparatus.

The diagram of FIG. 9, relates to the case last mentioned. In this diagram, in which the time is plotted as abscisse, there have been plotted on the horizontal line $L_1$ the times during which the pre-doses prepared in the chamber 48 are discharged into the pan 11, on the line $L_2$ the times during which the pre-doses prepared in the chamber 48 are discharged into the pan 11, on the line $L_2$ the times of flow of make-up material alternately into the pans 11 and 12, on the lines $L_4$ and $L_5$ the times of discharge onto the gates $14_1$, $14_2$ of the doeses contained in the pans 11 and 12 respectively, and on the lines $L_6$ and $L_7$ the times of release into the conveyor buckets 15 of the doses retained by the gates $14_1$ and $14_2$ respectively.

The pre-doses which are delivered during equal periods of time can have unequal weights. Consequently, inasmuch as the make-up quantities are distributed at constant speed, said quantities are distributed over variable time intervals as shown on the line $L_3$. On this line, the letters $a$ represent the cyclic pulses and the letters $b$ represent the end-of-weighing pulses.

It will be apparent from this diagram that the delivery of the pre-dose contained in one of the pans 11 (or 12) and the supply of make-up material into the other pan 12 (or 11) are initiated simultaneously with the delivery of each cyclic pulse.

The adjustment of the volumetric doses which are prepared in the chambers 47 and 48 can be effected by adjusting the spacing between the top blades $1_1$, $1_2$ and bottom blades $2_1$ and $2_2$. The adjustment can be performed by hand by producing action on the screw 21 (as shown in FIG. 4) or else can be rendered automatic by means of a micro-motor which modifies the spacing between the blades, taking into account any divergences in the same direction which prevail in the weighing of previous pre-doses. The information which is utilized for this adjustment can be either the speed of the cylinder 6 for the supply of make-up tobacco when this latter is regulated or the time of operation of said cylinder 6 under conditions of constant-speed operation.

In accordance with the alternative form of FIG. 5, the operation of the blades 1 is carried out by means of compressed-air jacks 24 of the double-acting electro-valve type. However, in view of the need to obtain immediate responses to the general pulses of the machine, especially to the pulse which controls the cutting of tobacco, the movement of the blade 1 is controlled by the expansion of the spring 25 which is released at the requisite moment by the release of the hook 26 as this latter comes into abutting contact with the stop 27.

In accordance with the alternative form which is illustrated in FIG. 7, the volumetric regulation of the pre-doses can permit the direct supply of these latter to the buckets 15 of the chain conveyor, thereby avoiding the need for systematic weighing of each dose. Under the action of a constant pressure exerted on the mass of tobacco which rests on the bottom blade 2, it is possible to obtain a uniform weight of dose within a predetermined volume which is defined by the spacing of the two blades 1 and 2. The type or types of tobacco used can also be taken into account.

In this case, the supply of tobacco to the pre-dose passageways 44 and 46 is carried out by means of the feeding and separating cylinders $16_1$, $16_3$ for a certain period of time after these latter have been set in motion under the action of an electromagnetic clutch system is controlled by the device for detecting the level of tobacco within each passageway and, as soon as this supply comes to an end, the compression ram 28 (shown in FIG. 7) is put under pressure after the hinged deflector plates $19_1$ shown in FIG. 2 have withdrawn to one side. At the end of the compression stroke, the top blade $1_1$ cuts the tobacco and the volume delimited has a substantially uniform weight.

Figure 8:
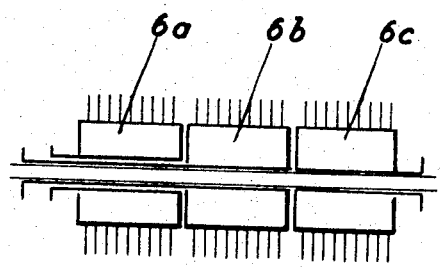
FIG. 8 is a detail view of an alternative form of embodiment of the device for supplying make-up material.

In the alternative form of FIG. 8, the cylinder 6 of the make-up passageway 45 is composed of separate cylinders 6a, 6b, 6c which can successively be thrown out of action under the control of information related to the progress of the weighing operation as supplied by systems such as strain gauges, pallets, electroplungers.

What I claim is:

1. Apparatus for preparing equal and successive ponderal doses of material and particularly of tobacco by means of volumetric pre-doses completed by make-up doses, comprising separate means for preparing two pre-doses of determined volume, means for supplying make-up material disposed between said separate means for preparing the two pre-doses and at an equal distance from each of said preparing means, two intermediate receiving units located under said respective pre-doses preparing means for receiving said prepared pre-doses directly under the action of their own weight and said make-up material and for constituting the requisite ponderal doses, means for weighing each of said intermediate receiving units and adapted to deliver an end-of-weighing signal when the weight of material contained in said receiving units reaches a predetermined value, means for releasing each pre-dose once said pre-dose has been prepared, means for distributing the make-up material to said intermediate receiving units, located beneath said means for supplying said make-up material, control means for said distributing means providing a simultaneous distribution of the make-up material into one of said intermediate receiving units and of a pre-dose in the other one of said units, means for distributing prepared doses from the intermediate receiving units into transfer containers brought successively to the apparatus, and means for controlling said preparing means and releasing means depending upon determined cyclic signals and on said end-of-weighing signals.

2. Apparatus as claimed in claim 1 wherein said means for distributing to the transfer containers the doses made up in the intermediate receiving units comprise vertical passageways having a bottom opening and located beneath each of said intermediate receiving units, and a controlled opening gate closing said bottom opening of said passageways.

3. Apparatus as claimed in claim 1 wherein each of said means for preparing the predoses comprise vertical supply passageways and two parallel blades slidingly mounted transversely to each of said passageways and adapted to close and free said passageways.

4. Apparatus as claimed in claim 1 wherein each of said means for preparing the pre-doses comprise vertical supply passageways and two parallel blades slidingly mounted transversely to each of said passageways and adapted to close and free said passageways, one of said blades being movable in the vertical direction whereby permitting adjustment of the spacing between the blades.

5. Apparatus as claimed in claim 1, wherein said means for supplying make-up material comprise a vertical passageway, a studded cylinder, and a crumbling cylinder cooperating with said studded cylinder, means to drive said studded cylinder, means to drive said crumbling cylinder and means to regulate the speed of said studded cylinder.

6. Apparatus as claimed in claim 1 wherein said means for distributing the make-up material to said intermediate receiving units comprise a pallet pivotally mounted above said receiving units, at an equal distance from said units, and adapted to be directed either towards one of said units or towards the other, and controlled means to stop the supply of material towards said units.

7. Apparatus as claimed in claim 1, wherein said means for distrubting the make-up material to said intermediate receiving units comprise a pallet pivotally mounted above said receiving units, at an equal distance from said units, and adapted to be directed either towards one of said units or towards the other, a horizontal plate adapted to vibrate in its own plane and located between said pallet and said receiving units, and control means to impart vibrations to said plate.

8. Apparatus for preparing equal and successive ponderal doses of material and particularly of tobacco by means of volumetric pre-doses completed by make-up doses which comprises one hopper, one tank located under said hopper to receive the material discharged by said hopper, partition walls into said tank to divide said tank into three compartments, feed rollers mounted inside said compartments, separating cylinders adapted to distribute said material onto said feed rollers, means to drive said separating cylinders, means to detect the level of said material in said compartments, means to regulate the speed of said separating cylinders according to said level, first and second vertical supply passageways for preparing two predoses of determined volume, each fed by one of said compartments, two parallel blades slidingly mounted transverse to each of said passageways and adapted to close and free said passageways, a third vertical passageway for supplying make-up material disposed between said passageways for preparing the pre-doses, a studded cylinder, and a crumbling cylinder cooperating with said studded cylinder inside said third passageway, means to drive said studded cylinder, means to drive said crumbling cylinder and means to regulate the speed of said studded cylinder, first and second intermediate receiving units located respectively under said first and second passageways for receiving said prepared pre-doses directly under the action of their own weight and said make-up material and for constituting the requisite ponderal doses, means for weighing each of said intermediate receiving units and adapted to deliver an end-of-weighing signal when the weight of material contained in said receiving units reaches a predetermined value, a pallet pivotally mounted above said receiving units, at an equal distance from said units, and adapted to be directed either towards one of said units or towards the other, a horizontal plate adapted to vibrate in its own plane and located between said pallet and said receiving units, control means to impart vibrations to said plate whereby distributing the make-up material to one or the other of said intermediate receiving units, vertical passageways having a bottom opening and located beneath each of said intermediate receiving units, a controlled opening gate closing said bottom opening of said passageways for distributing said prepared doses from the intermediate units to transfer containers brought successively to the apparatus and means controlling said preparing, releasing and distributing means in dependence on determined cyclic signals and on said end-of-weighing signals.

9. Apparatus for preparing equal and successive ponderal doses of material and particularly of tobacco by means of volumetric pre-doses completed by make-up doses, comprising separate means for preparing two pre-doses of determined volume, means for supplying make-up material, two intermediate receiving units located under said respective pre-doses preparing means for re-receiving said prepared pre-doses and said make-up material and for constituting the requisite ponderal doses, means for weighing each of said intermediate receiving units and adapted to deliver an end-of-weighing signal when the weight of material contained in said receiving units reaches a predetermined value, means for releasing each pre-dose once said pre-dose has been prepared, means for distributing the make-up material to said intermediate receiving units, control means for said distributing means providing a simultaneous distribution of the make-up material into one of said intermediate receiving units and of a pre-dose in the other one of said units, means for distributing prepared doses from the intermediate receiving units into transfer containers brought successively to the apparatus, and means for controlling said preparing means and releasing means depending upon determined cyclic signals and on said end-of-weighing signals.

10. Apparatus as claimed in claim 9 wherein said means for distributing to the transfer containers the doses made up in the intermediate receiving units comprise vertical passageways having a bottom opening and located beneath each of said intermediate receiving units, and a controlled opening gate closing said bottom opening of said passageways.

11. Apparatus as claimed in claim 9 wherein each of said means for preparing the predoses comprise vertical supply passageways and two parallel blades slidingly mounted transversely to each of said passageways and adapted to close and free said passageways.

12. Apparatus as claimed in claim 9 wherein each of said means for preparing the pre-doses comprise vertical supply passageways and two parallel blades slidingly mounted transversely to each of said passageways and adapted to close and free said passageways, one of said blades being movable in the vertical direction whereby permitting adjustment of the spacing between the blades.

13. Apparatus as claimed in claim 9 wherein said means for supplying make-up material comprise a vertical passageway, a studded cylinder, and a crumbling cylinder cooperating with said studded cylinder, means to drive said studded cylinder, means to drive said crumbling cylinder and means to regulate the speed of said studded cylinder.

14. Apparatus as claimed in claim 9 wherein said means for distributing the make-up material to said intermediate receiving units comprise a pallet pivotally mounted above said receiving units, at an equal distance from said units, and adapted to be directed either towards one of said units or towards the other, and controlled means to stop the supply of material towards said units.

15. Apparatus as claimed in claim 9 wherein said means for distributing the make-up material to said intermediate receiving units comprise a pallet pivotally mounted above said receiving units, at an equal distance from said units, and adapted to be directed either towards one of said units or towards the other, a horizontal plate adapted to vibrate in its own plane and located between said pallet and said receiving units, and control means to impart vibrations to said plate.

References Cited

UNITED STATES PATENTS

| | | |
|---|---|---|
| 1,883,460 | 10/1932 | Ayars. |
| 2,138,356 | 11/1938 | Ryan et al. |
| 2,588,483 | 3/1952 | Chapman. |
| 3,073,400 | 1/1963 | Bauder et al. _____ 222—77 X |
| 3,096,837 | 7/1963 | Abbott et al. _____ 222—55 X |

FOREIGN PATENTS

| | | |
|---|---|---|
| 1,376,384 | 9/1964 | France. |
| 818,288 | 8/1959 | Great Britain. |

LAVERENE D. GEIGER, *Primary Examiner.*

H. S. BELL, JR., *Assistant Examiner.*